(12) United States Patent
Watanabe et al.

(10) Patent No.: US 10,597,086 B2
(45) Date of Patent: Mar. 24, 2020

(54) VEHICLE BODY STRUCTURE

(71) Applicant: HONDA MOTOR CO., LTD., Tokyo (JP)

(72) Inventors: Masato Watanabe, Wako (JP); Sadayuki Asano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 28 days.

(21) Appl. No.: 16/027,555

(22) Filed: Jul. 5, 2018

(65) Prior Publication Data

US 2019/0009824 A1    Jan. 10, 2019

(30) Foreign Application Priority Data

Jul. 5, 2017    (JP) .................. 2017-131787

(51) Int. Cl.
*B62D 25/02* (2006.01)
*B62D 25/20* (2006.01)
*B62D 21/15* (2006.01)

(52) U.S. Cl.
CPC ......... *B62D 25/025* (2013.01); *B62D 21/157* (2013.01); *B62D 25/2081* (2013.01)

(58) Field of Classification Search
CPC . B62D 25/025; B62D 25/2081; B62D 21/157
USPC ................................. 296/209, 198
See application file for complete search history.

(56) References Cited

U.S. PATENT DOCUMENTS

| | | | |
|---|---|---|---|
| 9,669,880 B2 * | 6/2017 | Ruess .................. | B62D 25/025 |
| 10,160,496 B2 * | 12/2018 | Kim .................... | B62D 21/157 |
| 10,259,504 B2 * | 4/2019 | Park ..................... | B62D 25/025 |
| 2005/0248185 A1 * | 11/2005 | Hayashi ............... | B62D 24/02 296/193.07 |
| 2012/0306239 A1 | 12/2012 | Tamura et al. | |
| 2018/0154944 A1 * | 6/2018 | Kim .................... | B62D 21/157 |
| 2019/0168815 A1 * | 6/2019 | Wada ................... | B62D 25/02 |

FOREIGN PATENT DOCUMENTS

| | | | | |
|---|---|---|---|---|
| DE | 102016109609 A1 | * | 12/2016 | ........... B62D 25/025 |
| JP | 2008-001244 A | | 1/2008 | |
| JP | 2009-029323 A | | 2/2009 | |

(Continued)

OTHER PUBLICATIONS

Japanese Office Action with English translation dated Mar. 19, 2019, 16 pages.

(Continued)

*Primary Examiner* — Jason S Morrow
(74) *Attorney, Agent, or Firm* — Rankin, Hill & Clark LLP

(57) ABSTRACT

An object of the present invention is to provide a vehicle body structure with improved rigidity of a vehicle body. The vehicle body structure includes a side sill extending in a vehicle front-rear direction and having at least a side sill inner member, a side sill reinforcing member disposed outside in a vehicle width direction of the side sill inner member at a rear portion of the side sill inner member, and a wheel arch member disposed behind the side sill, wherein the side sill reinforcing member includes a first fixing portion fixed to an outer surface of the wheel arch member from the outside in the vehicle width direction, and a second fixing portion fixed to a front surface of the wheel arch member from the front.

6 Claims, 8 Drawing Sheets

(56) References Cited

FOREIGN PATENT DOCUMENTS

| | | |
|---|---|---|
| JP | 2012-030689 A | 2/2012 |
| JP | 2012-188015 A | 10/2012 |
| JP | 2013-119337 A | 6/2013 |
| JP | 2016-068581 A | 5/2016 |
| WO | 2011/118618 A1 | 9/2011 |

OTHER PUBLICATIONS

Japanese Office Action received in corresponding JP application No. 2017-131787 dated Nov. 5, 2019 with English translation (7 pages).

\* cited by examiner

IV-IV

VEHICLE BODY STRUCTURE

CROSS REFERENCE TO RELATED APPLICATIONS

This application claims the foreign priority benefit under Title 35, United States Code, § 119 (a)-(d) of Japanese Patent Application No. 2017-131787, filed on Jul. 5, 2017, the disclosure of which is herein incorporated by reference in its entirety.

TECHNICAL FIELD

The present invention relates to a vehicle body structure.

BACKGROUND ART

In the conventional vehicle body structure, a pair of left and right side sills extends in a vehicle front-rear direction. A side sill reinforcing member is provided at a rear portion of the side sill. In addition, a wheel arch which covers a periphery of a rear wheel is disposed behind the side sill. The side sill reinforcing member is fixed to an outer surface of the wheel arch and is connected to the wheel arch (for example, see Japanese Patent Application Publication No. 2012-030689). In such a case, a load applied to the side sill in the vehicle front-rear direction is transmitted to the outer surface of the wheel arch via the side sill reinforcing member.

CITATION LIST

Patent Literature

Patent Document 1: Japanese Patent Application Publication No. 2012-030689

SUMMARY OF INVENTION

Technical Problem

In the conventional vehicle body structure, the side sill reinforcing member is joined only to a joining portion on the outer surface of the wheel arch, so that the side sill and the wheel arch are connected. Therefore, there has been a possibility that stress concentrates on the joining portion, and rigidity against torsion of a vehicle body during traveling is insufficient. An object of the present invention is to provide a vehicle body structure with improved rigidity of the vehicle body.

Solution to Problem

The present invention is a vehicle body structure including a side sill extending in a vehicle front-rear direction and having at least a side sill inner member, a side sill reinforcing member disposed outside in a vehicle width direction of the side sill inner member at a rear portion of the side sill, and a wheel arch member disposed behind the side sill, wherein the side sill reinforcing member includes a first fixing portion fixed in the vehicle width direction to an outer surface of the wheel arch member, and a second fixing portion fixed in the vehicle front-rear direction to a front surface of the wheel arch member.

Advantageous Effects of Invention

According to the present invention, it is possible to provide a vehicle body structure with improved rigidity of a vehicle body.

DESCRIPTION OF EMBODIMENTS

Figure 1:
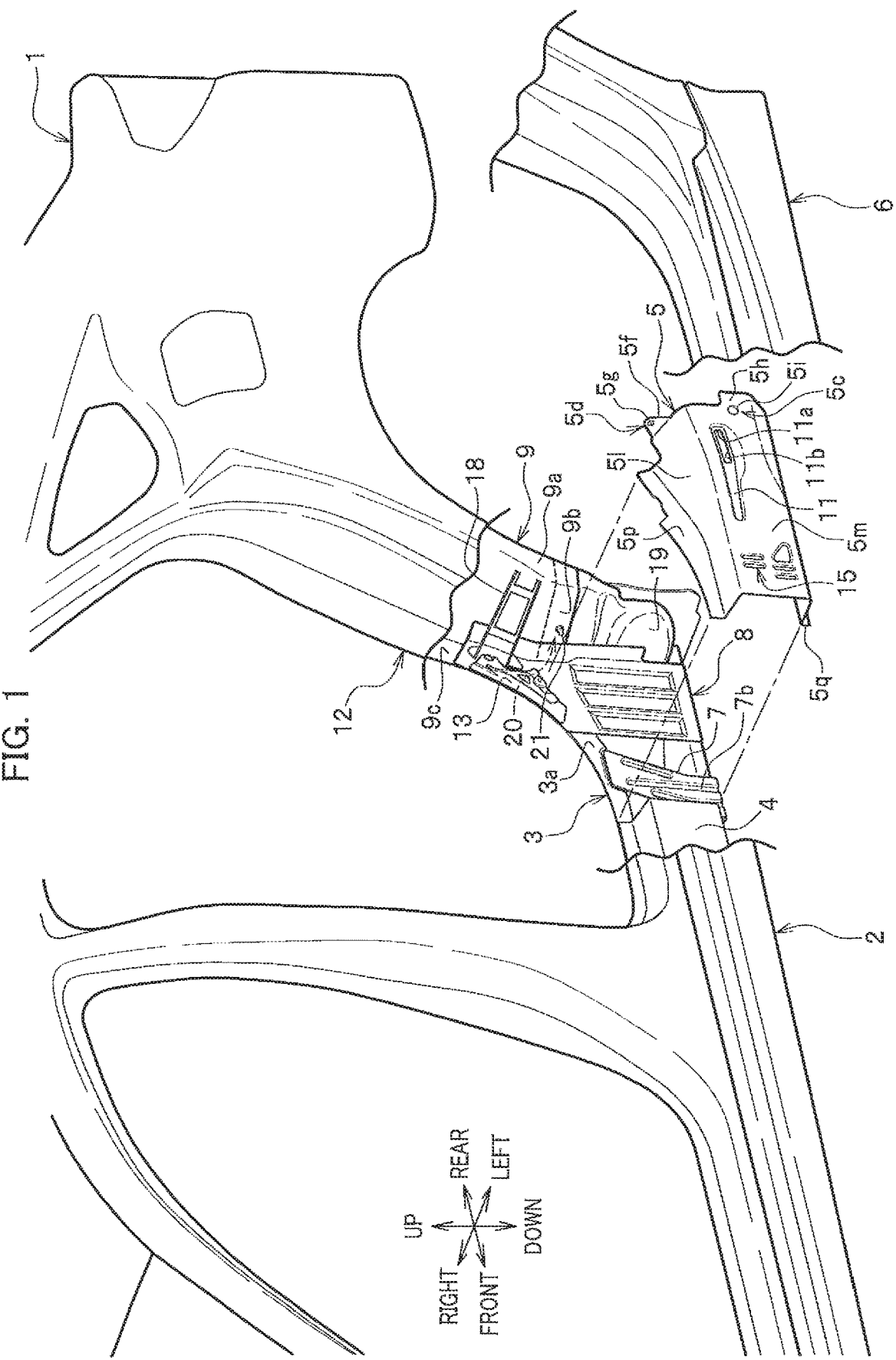
FIG. 1 is an exploded perspective view of a main portion showing a state in which a side sill reinforcing member is disposed with a decorative member covering a side sill being removed in a vehicle body structure according to an embodiment of the present invention.

Hereinafter, an embodiment of the present invention will be described with reference to the drawings as appropriate. The same components are denoted by the same reference numerals, and redundant description will be omitted. When describing the direction, unless otherwise specified, description will be made basically based on the front, rear, left, right, up and down viewed from the driver. Further, a "vehicle width direction" is synonymous with a "left-right direction".

FIG. 1 shows a configuration of a vehicle body structure according to an embodiment of the present invention, and is an exploded perspective view of a main portion. A pair of side sills 2, 2 is provided at the left and right side edge portions of a floor panel 10 of a vehicle 1 of the present embodiment. The side sill 2 mainly includes a side sill inner member 3, a side sill outer member 4, a side sill reinforcing member 5 disposed on the outside in the vehicle width direction of the side sill inner member 3 and at a rear portion of the side sill outer member 4, and a decorative member 6 such as a side sill garnish or the like which covers the side sill 2.

The side sill inner member 3 and the side sill outer member 4 each have a substantially hat-shaped cross-section. The side sill inner member 3 and the side sill outer member 4 are joined together at flange portions thereof formed in upper and lower edge portions thereof from the left and right in the vehicle width direction. Thus, the side sill 2 has a hollow shape with a substantially rectangular cross-section and is disposed with its longitudinal direction aligned in the left-right direction of the vehicle.

Figure 2:
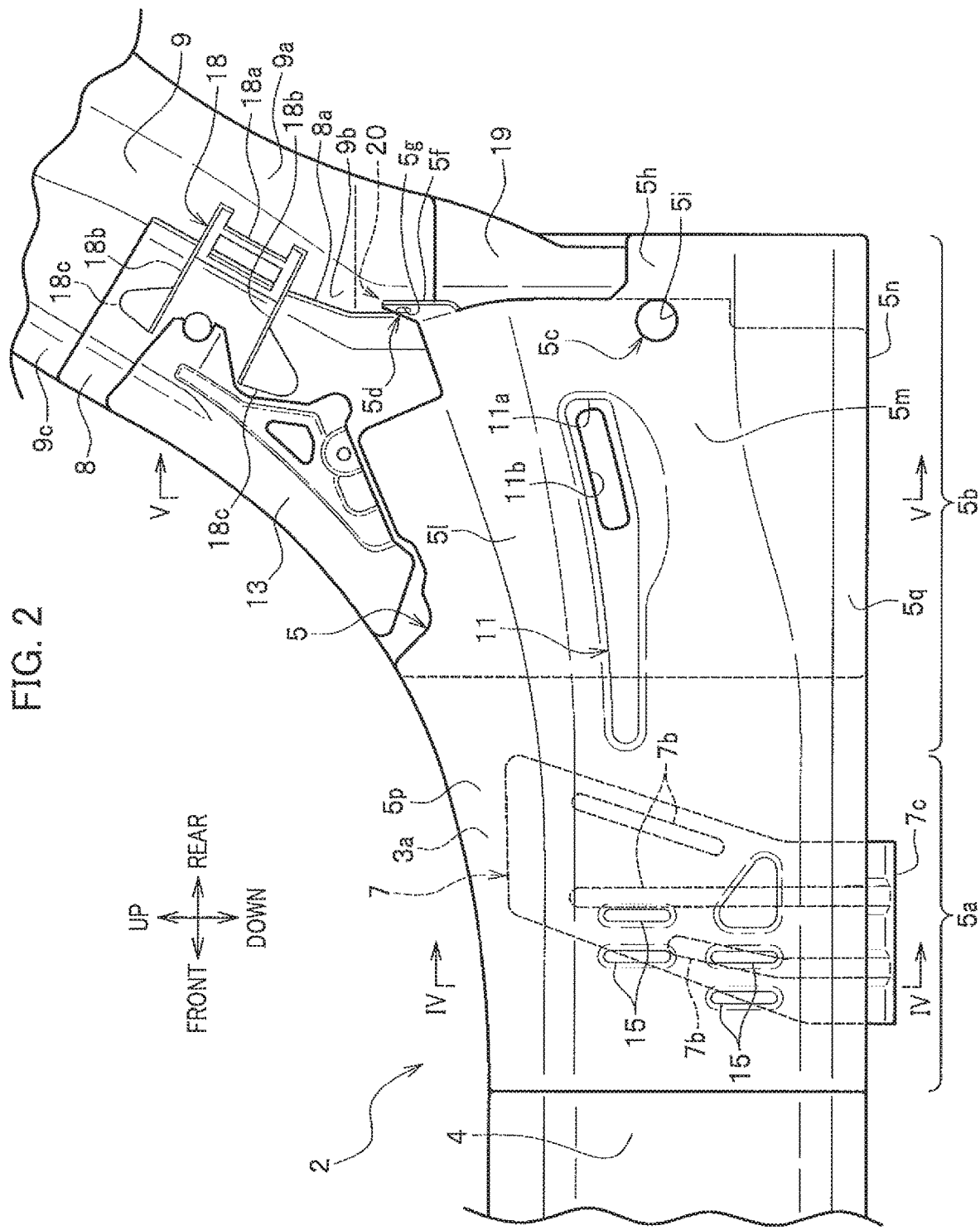
FIG. 2 is a side view showing the side sill reinforcing member mounted on a rear portion of the side sill.

Among them, the side sill outer member 4 is formed to be shorter than the side sill inner member 3 by a predetermined dimension. As shown in FIG. 2, a side sill reinforcing member 5 having a substantially hat-shaped cross-section is provided at a rear portion of the side sill 2 of the present embodiment so as to be continuous with the side sill outer member 4. Similarly to the side sill outer member 4, each side sill reinforcing member 5 is joined to a rear portion 3*a* of the side sill inner member 3 from the left or right side in the vehicle width direction, so as to have a hollow shape having a substantially rectangular shape (See FIGS. 4 and 5).

A wheel arch member 9 is disposed behind the side sill 2. The wheel arch member 9 has a front surface 9*b* formed in a curved arc shape in a side view so as to follow a circumferential shape of a tire. An arch-shaped outer surface 9*a* having a predetermined width is integrally provided on an outer edge of the front surface 9*b*. Further, a joint flange portion 9*c* is integrally provided along a curved shape of the front surface 9*b* on an inner edge of the wheel arch member 9.

Figure 3:
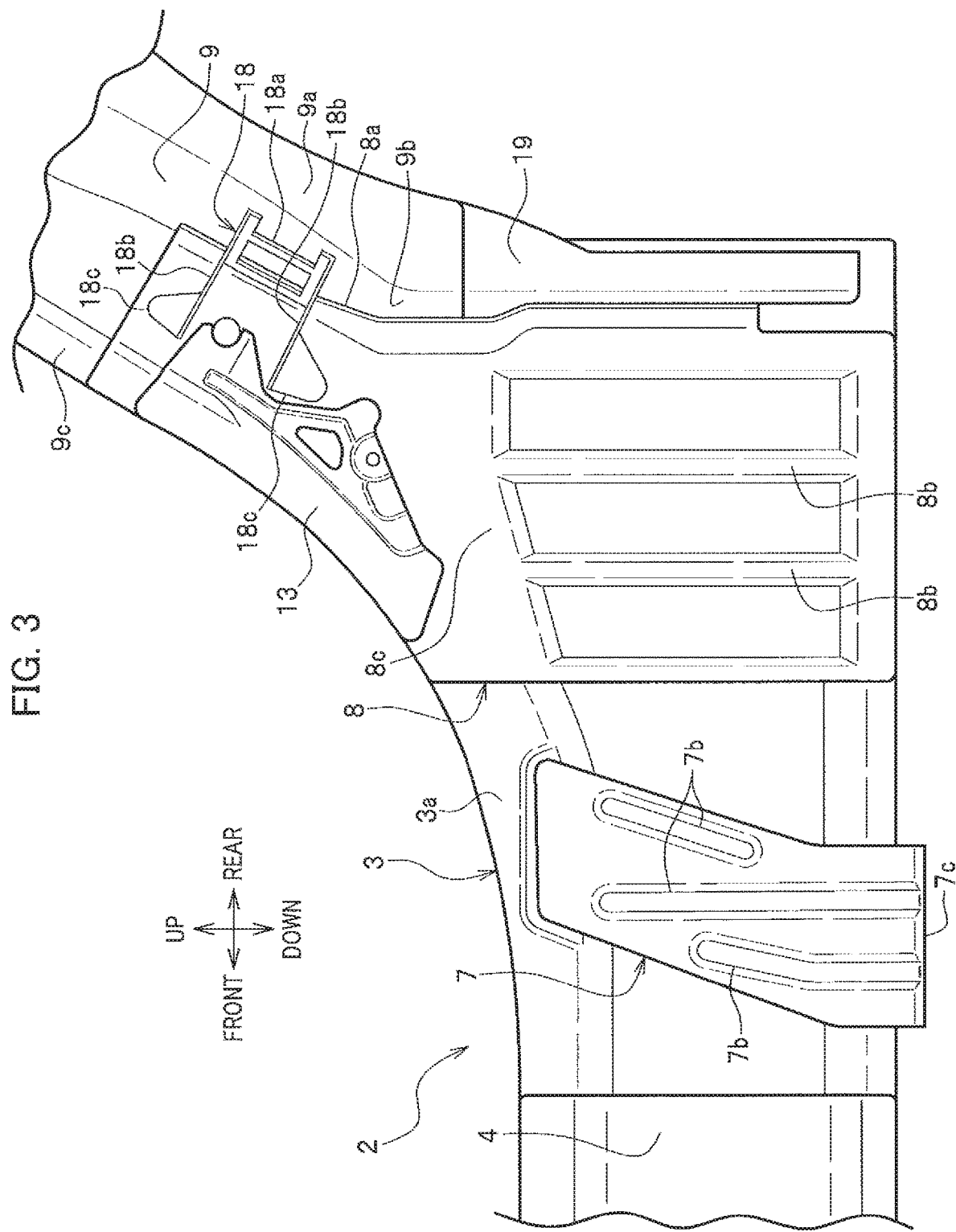
FIG. 3 is a side view showing a structure in which the side sill reinforcing member is removed from the rear portion of the side sill.

As shown in FIGS. 2 and 3, a flange reinforcing member 18 is provided on the front surface 9*b* side of the wheel arch member 9 of the present embodiment. The flange reinforcing member 18 has a fixed surface portion 18*a* fixed above the side sill reinforcing member 5 and a pair of fixing leg portions 18*b*. A contact surface 18*c* is formed in each of the fixing leg portions 18*b*. The contact surface 18*c* is bent in a substantially perpendicular direction at a distal end of each of the fixing leg portions 18*b*, and an out-of-plane direction thereof faces inward of the vehicle (see FIG. 8). The contact surface 18*c* is joined to a plate-like portion 8*c* of a wheel arch reinforcing member 8 and the joint flange portion 9*c* by overlapping in the vehicle width direction.

As shown in FIG. 2, the side sill reinforcing member 5 includes a side surface portion 5*m* positioned on the vehicle outer side and having a surface inner-outer direction in the vehicle width direction, an upper surface portion 5*l* and a lower surface portion 5*n* substantially perpendicular to the side surface portion 5*m*. Joint flange portions 5*p*, 5*q* are respectively provided on inner edges of the upper surface portion 5*l* and the lower surface portion 5*n*, and are joined in the vehicle width direction to joint flanges formed at opposing positions of upper and lower side edges of the side sill inner member 3.

A first fixing portion 5*c* is provided at a rear edge portion of the side surface portion 5*m*. Further, a second fixing portion 5*d* is provided at a rear edge portion of the upper surface portion 5*l*. Among them, the first fixing portion 5*c* has a rear piece portion 5*h* extending rearward from a rear edge of the side surface portion 5*m* of the side sill reinforcing member 5. A mounting hole 5*i* is opened and formed in the rear piece portion 5*h*. In the side sill reinforcing member 5 of the present embodiment, as shown in FIG. 1, the rear piece portion 5*h* of the first fixing portion 5*c* is brought into contact with a wheel arch extension member 19 extending downward from the outer surface 9*a* of the wheel arch member 9 from the outside in the vehicle width direction. In this state, the first fixing portion 5*c* is fixed to the wheel arch member 9 by fastening a mounting tool such as a bolt member (not shown) through the mounting hole 5*i*.

Further, the second fixing portion 5*d* has a mounting piece portion 5*f*. The mounting piece portion 5*f* is provided to project rearward and upward from a rear edge of the upper surface portion 5*l*. The mounting piece portion 5*f* of the present embodiment is bent by about 90 degrees toward the upper side of the vehicle, to be formed in a tongue-like shape with the surface inner-outer direction facing a vehicle front-rear direction. Further, a mounting hole 5*g* is opened with an axial direction thereof in the vehicle front-rear direction in the mounting piece portion 5*f*.

On the other hand, a bolt member 21 protrudes from the front surface 9*b* of the wheel arch member 9. When the bolt member 21 is inserted through the mounting hole 5*g* formed in the mounting piece portion 5*f*, the mounting piece portion 5*f* comes into contact with the front surface 9*b* from the front. At this time, a mounting surface of the mounting piece portion 5*f* is bent with the surface inner-outer direction facing the vehicle front-rear direction. Therefore, the mounting piece portion 5*f* makes the mounting surface contact the front surface 9*b* of the wheel arch member 9 with a predetermined area. In this state, the second fixing portion 5*d* is fixed to the wheel arch member 9 in the vehicle front-rear direction by fastening the mounting piece portion 5*f* to the front surface 9*b* by the bolt member 21.

Figure 4:
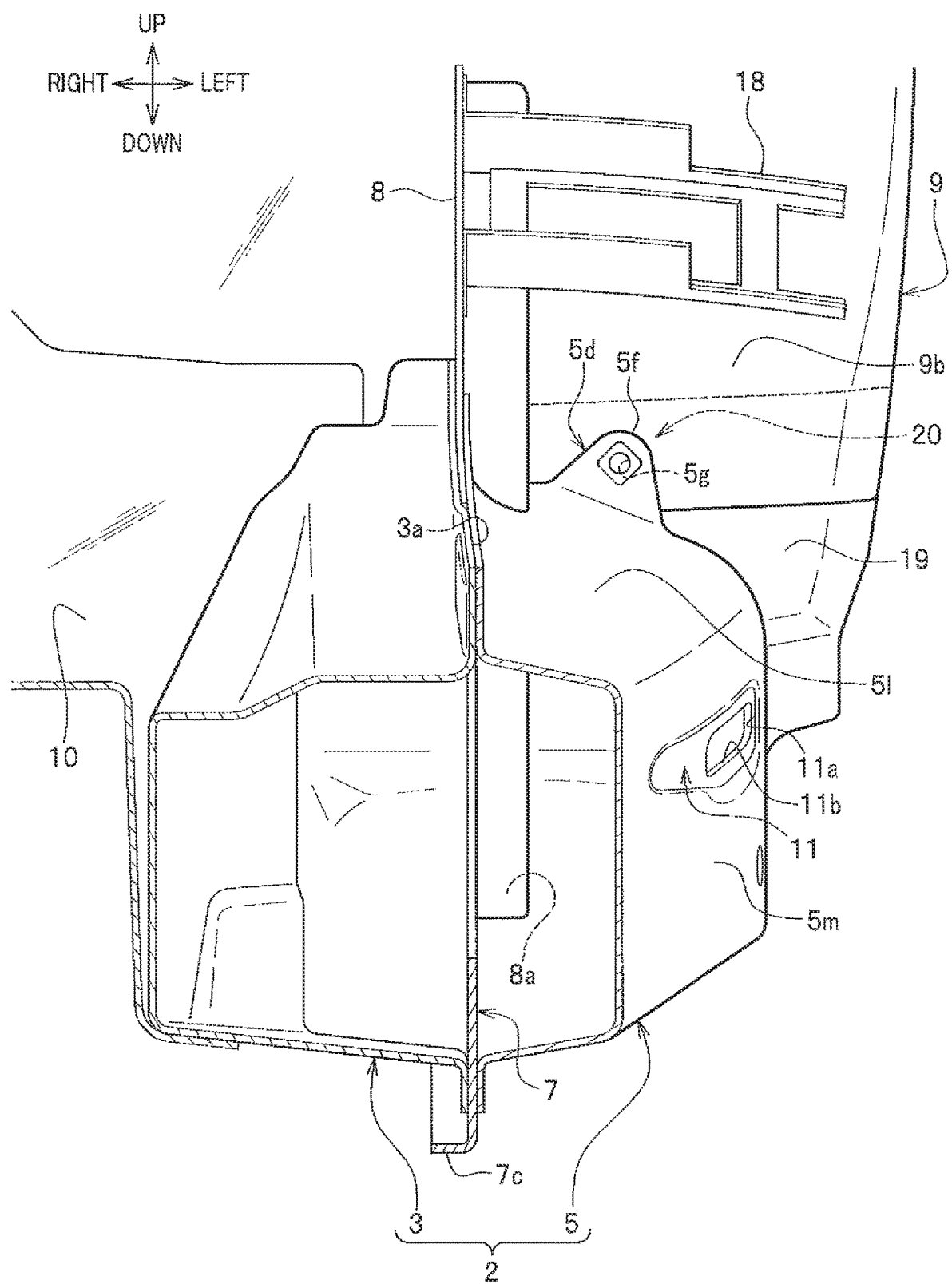
FIG. 4 is a cross-sectional view taken along a line IV-IV in FIG. 2 showing a structure of the side sill.
Figure 5:
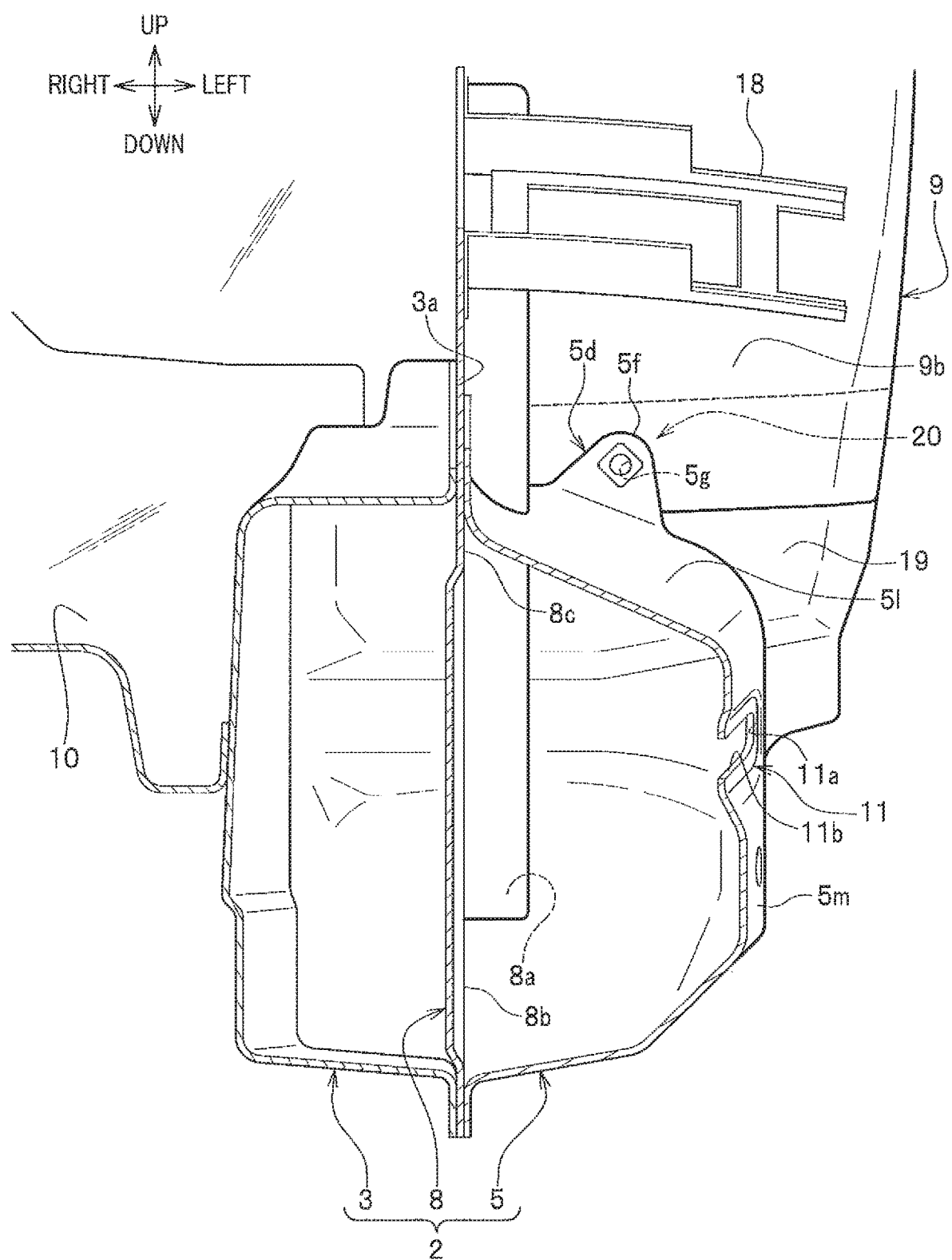
FIG. 5 is a cross-sectional view taken along a line V-V in FIG. 2 showing the structure of the side sill.

Further, when the side sill reinforcing member 5 is fixed to the wheel arch member 9 by the first fixing portion 5*c* and the second fixing portion 5*d*, the side sill reinforcing member 5 is continuous with the side sill outer member 4 in the vehicle front-rear direction, and is positioned at an outer position of the rear portion 3*a* of the side sill inner member 3. Therefore, the side sill 2 is disposed at an accurate position in front of the wheel arch member 9. As shown in FIGS. 4 and 5, the side sill 2 connected to the front surface 9*b* has a hollow closed cross-sectional shape by the side sill inner member 3, the side sill outer member 4, and the side sill reinforcing member 5.

As shown in FIG. 2, the side sill reinforcing member 5 is provided with a lateral bead 11. The lateral bead 11 is formed in the side surface portion 5*m* located on the outer surface in the vehicle width direction with its longitudinal direction aligned in the vehicle front-rear direction. Further, an extending portion 11*a* inclined upward is continuously provided in a rear portion in the vehicle front-rear direction of the lateral bead 11 of the present embodiment. The extending portion 11*a* is configured to be gently expanded rearwardly in an up-down direction to be substantially fan-shaped in a side view. A seal hole portion 11*b* for injecting a sealing material is formed in a planar bottom portion of the extending portion 11*a*. The seal hole portion 11*b* is formed in a substantially oval shape in an extending direction of the extending portion 11*a* and penetrates the bottom portion in the vehicle width direction. The seal hole portion 11*b* of the present embodiment has an opening area through which a sealing work can be performed. The seal hole portion 11*b* is provided in the extending portion 11*a* of the lateral bead 11 having higher rigidity than the surrounding. Therefore, even when the seal hole portion 11*b* is formed to have a desired size, its strength can be maintained.

As shown in FIGS. 3 and 5, the wheel arch reinforcing member 8 is provided between the rear portion 3*a* of the side sill inner member 3 and the side sill reinforcing member 5. The wheel arch reinforcing member 8 mainly includes the plate-like portion 8*c* and a mounting surface portion 8*a* integrally formed in a rear edge portion of the plate-like portion 8*c* in the up-down direction.

The plate-shaped portion 8*c* has a substantially trapezoidal shape in a side view with the surface inner-outer direction facing the vehicle width direction. An upper edge portion and a lower edge portion of the plate-like portion 8*c* are sandwiched and joined between the rear portion 3*a* and the side sill reinforcing member 5. A plurality of reinforcing rib portions 8b are formed in the plate-like portion 8c at predetermined intervals in the vehicle front-rear direction.

The mounting surface portion 8a is formed so that the wheel arch reinforcing member 8 has a substantially L-shaped horizontal cross-section by bending the rear edge portion of the plate-like portion 8c to the vehicle outer side at about 90 degrees. Further, the mounting surface portion 8a is formed in a curved shape in a side view along the shape of the front surface 9b of the wheel arch member 9. Then, the mounting surface portion 8a is fixed to the front surface 9b from the front.

Further, as shown in FIG. 3, a jack-up plate 7 is sandwiched between the rear portion 3a of the side sill inner member 3 and the side sill reinforcing member 5. The jack-up plate 7 is joined at the front of the wheel arch reinforcing member 8 by the rear portion 3a and the side sill reinforcing member 5 from the left and right in the vehicle width direction. As shown in FIG. 3, the jack-up plate 7 has a main body portion 7a, a reinforcing bead 7b, and a contact surface 7c. Among them, the main body portion 7a has a substantially parallelogram plate shape in a side view, and a plurality of reinforcing beads 7b are formed at predetermined intervals. Further, the contact surface 7c is bent by about 90 degrees along a lower edge of the main body portion 7a to have a substantially L-shaped vertical cross-section, and is formed integrally with the main body portion 7a. Then, as shown in FIG. 3, the jack-up plate 7 is disposed in front of the wheel arch reinforcing member 8 in an inner space of the side sill 2. As shown in FIGS. 4 and 5, the jack-up plate 7 and the wheel arch reinforcing member 8 are disposed at the center of the vehicle width direction in the inner space of the side sill 2.

Further, as shown in FIG. 2, the side sill reinforcing member 5 is provided so that a straight portion 5a and a widened portion 5b are integrally formed in the vehicle front-rear direction. Among them, the straight portion 5a is configured to have a fixed vehicle width dimension and a fixed up-down dimension in the vehicle front-rear direction together with the rear portion 3a of the side sill inner member 3 (see FIG. 3). Further, the widened portion 5b is configured to gradually widen the vehicle width dimension and the up-down dimension behind the straight portion 5a in the vehicle front-rear direction (see FIG. 4). The side sill reinforcing member 5 extends in a longitudinal direction of a hollow portion in the vehicle front-rear direction together with the rear portion 3a of the side sill inner member 3.

As shown in FIG. 2, a plurality of vertical beads 15 is formed in the side surface portion of the straight portion 5a. The longitudinal bead 15 is formed with its longitudinal direction aligned in a vehicle up-down direction. Therefore, in a joined state in which the jack-up plate 7 is sandwiched between the side sill inner member 3 and the side sill reinforcing member 5, the vertical beads 15 of the straight portion 5a can be disposed corresponding to a position where the jack-up plate 7 is disposed. Furthermore, in the present embodiment, at least a part of the reinforcing bead 7b of the jack up plate 7 and the vertical beads 15 of the side sill reinforcing member 5 are configured to overlap in the vehicle width direction.

Figure 7:
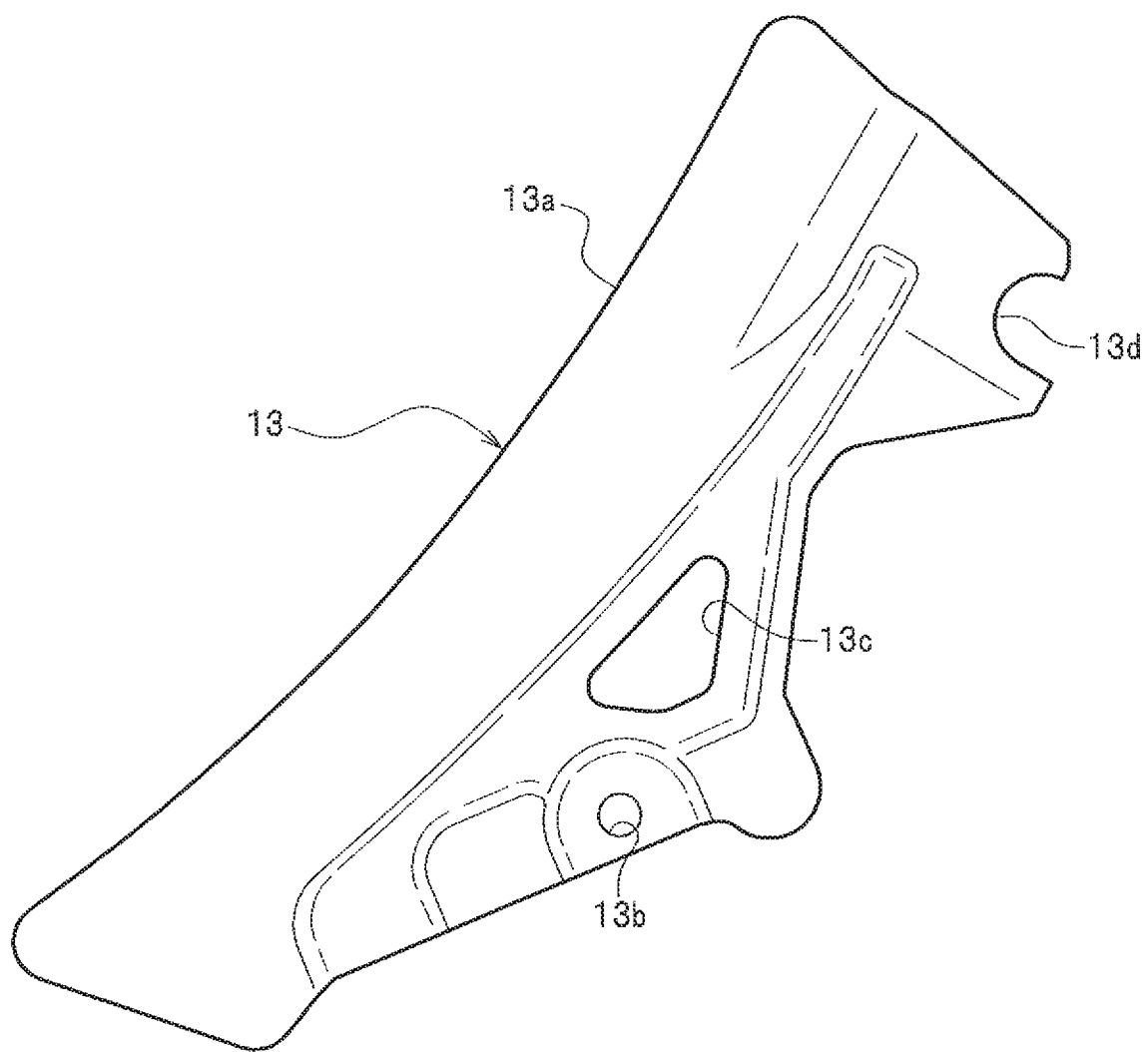
FIG. 7 is a perspective view showing an opening portion reinforcing member mounted on an opening peripheral edge portion of a door.
Figure 8:
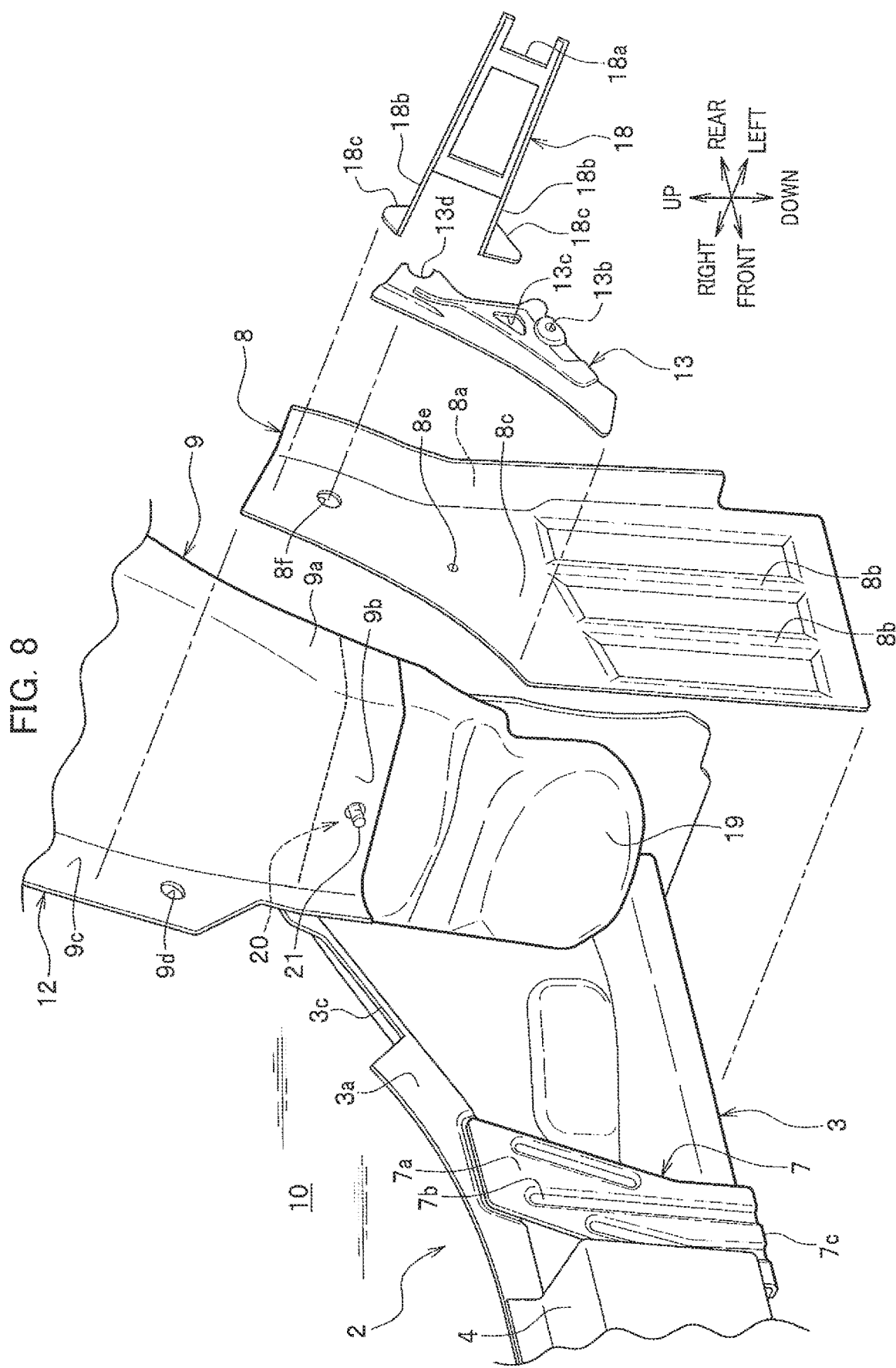
FIG. 8 is an exploded perspective view showing how the opening portion reinforcing member is mounted on the opening peripheral edge portion of the door together with a wheel arch reinforcing member.

Further, as shown in FIG. 8, an opening portion reinforcing member 13 for reinforcing an opening peripheral edge portion 12 of a door by being mounted along the opening peripheral edge portion 12 is provided on an upper portion of the wheel arch reinforcing member 8 of the present embodiment. As shown in FIG. 7, the opening portion reinforcing member 13 has a side edge portion 13a, a bolt hole portion 13b, a through-hole 13c, and a bolt-avoiding recess 13d. Among them, the side edge portion 13a is formed in an arc shape so as to follow a curved shape of the opening peripheral edge portion 12.

As shown in FIG. 8, a stepped portion 3c having a cut-out shape is provided in the rear portion 3a of the side sill inner member 3 of the present embodiment. The stepped portion 3c is located between the joint flange portion 9c integrally formed with a peripheral edge of the wheel arch member 9 and the rear portion 3a. By this stepped portion 3c, a recess is formed in the opening peripheral edge portion 12 so as to discontinue a part of the curved shape. The upper portion of the wheel arch reinforcing member 8 is brought into contact with the joint flange portion 9c of the wheel arch member 9 from the vehicle outer side so as to close the stepped portion 3c. In a contact state, a fastening member such as a bolt member (not shown) is inserted and fastened to a mounting hole 9d of the wheel arch member 9 and a bolt hole 8f of the wheel arch reinforcing member 8.

In the opening portion reinforcing member 13, a bolt member (not shown) inserted through a mounting hole 8e of the wheel arch reinforcing member 8 is inserted through the bolt hole portion 13b and fastened. The bolt member inserted into the mounting hole 9d of the joining flange portion 9c and the bolt hole 8f of the wheel arch reinforcing member 8 avoids the opening portion reinforcing member 13 so as not to be engaged with and interfere with a recess of the avoiding recess 13d. Then, rotation about a rotation center of a bolt member (not shown) inserted through the mounting hole 8e is stopped at a preset predetermined angle by the bolt member interfering with the recess 13d. Therefore, the opening portion reinforcing member 13 can be mounted on the wheel arch reinforcing member 8 with less mounting points.

The opening portion reinforcing member 13 is disposed make the cut-out portion continuous so as to correspond to the recesses of the stepped portion 3c. At this time, the opening peripheral edge portion 12 is reinforced by the opening portion reinforcing member 13 and continues in an arc shape, so that a desired torsional rigidity can be obtained. Therefore, even when the discontinuous cut-out recess is formed in the opening peripheral edge portion 12, a desired strength can be obtained efficiently. Therefore, the degree of freedom of molding of the side sill reinforcing member 5 can be improved. In addition, the opening portion reinforcing member 13 provided in the wheel arch reinforcing member 8 does not need to be connected to the opening peripheral edge portion 12 with respect to the through-hole 13c and the bolt avoiding recess 13d. Therefore, the opening portion reinforcing member 13 can be mounted by fastening the bolt member, and an increase in the number of welding points during welding can be prevented.

As shown in FIG. 8, when the wheel arch reinforcing member 8 is mounted on the wheel arch member 9 and the rear portion 3a of the side sill inner member 3, the opening portion reinforcing member 13 provided on the upper portion of the wheel arch reinforcing member 8 is disposed along the opening peripheral edge portion 12 of the door. Therefore, an upper end rear portion of the side sill inner member 3 and a front end portion of the joint flange portion 9c of the wheel arch member 9 are connected by the opening portion reinforcing member 13 to reinforce the opening peripheral edge portion 12. The opening portion reinforcing member 13 of the present embodiment is disposed along the curved shape of the opening peripheral edge portion 12. Therefore, the opening peripheral edge portion 12 of the door can improve the rigidity against torsion of the vehicle body due to its opening shape.

Figure 6:
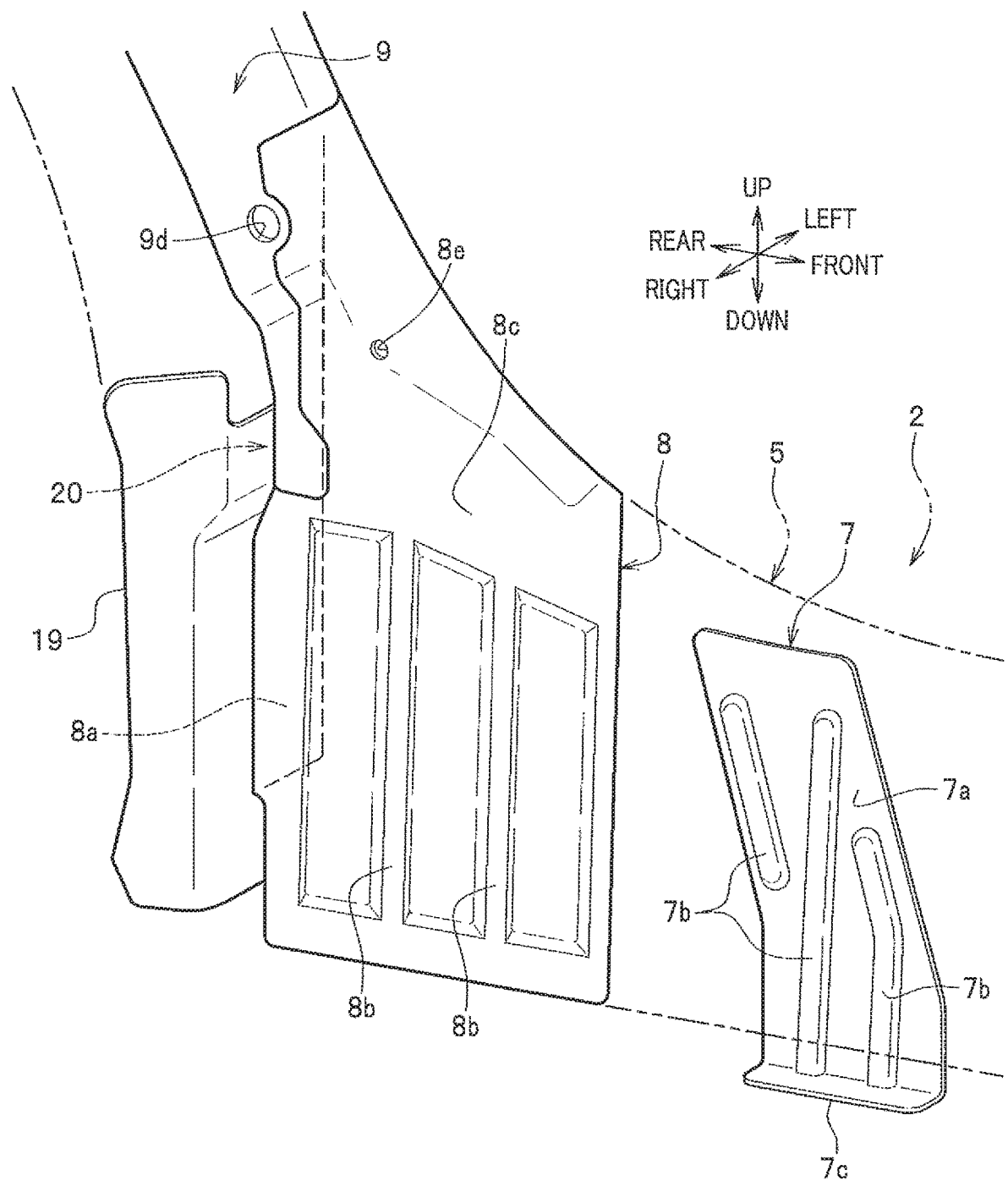
FIG. 6 is a perspective view of a main portion as seen from inside a vehicle compartment with a side sill inner being removed.

Further, as shown in FIGS. 6 and 8, the wheel arch member 9 has the wheel arch extension member 19 extending downward from the front surface 9b. A lower edge portion of the wheel arch member 9 and an upper edge portion of the wheel arch extension member 19 are overlapped with each other by a predetermined dimension in the up-down direction. A connecting portion 20 for overlapping and fixing the second fixing portion 5d to the overlapping portion is formed. The second fixing portion 5d is fixed to the connecting portion 20 whose rigidity in the surface inner-outer direction is improved by the overlapping as compared with other portions. Therefore, a mounting strength of the side sill reinforcing member 5 can be further improved.

As described above, in the vehicle body structure according to the present embodiment, as shown in FIG. 1, the vehicle 1 includes the side sill 2 extending in the front-rear direction and having at least the side sill inner member 3, the side sill reinforcing member 5 disposed outside in the vehicle width direction of the side sill inner member 3 at the rear portion 3a of the side sill 2, and the wheel arch member 9 disposed behind the side sill 2. As shown in FIG. 1 or FIG. 2, the first fixing portion 5c of the side sill reinforcing member 5 is fixed to the outer surface 9a of the wheel arch member 9 from the outside in the vehicle width direction. Further, the second fixing portion 5d is fixed to the front surface 9b from the front. Therefore, the vehicle body structure with improved rigidity of the vehicle body is provided.

Furthermore, in the vehicle 1 of the embodiment, as shown in FIGS. 1 and 2, the first fixing portion 5c and the second fixing portion 5d are joined at different angles at substantially right angles. Therefore, stress is distributed in these two connecting portions. Therefore, strength against a load in a torsional direction applied to the vehicle body during traveling can be improved. Therefore, the vehicle body structure with further improved rigidity of the vehicle body is provided. Further, the side sill reinforcing member 5 connects the side sill 2 and the wheel arch member 9 in the vehicle front-rear direction. Thus, a load applied in the vehicle front-rear direction can be efficiently transmitted between the side sill 2 and the wheel arch member 9. Therefore, the rigidity of the vehicle body can be improved also in this point.

Further, as shown in FIG. 2, the lateral bead 11 whose longitudinal direction aligned in the vehicle front-rear direction is provided on the outer surface in the vehicle width direction of the side sill reinforcing member 5. Therefore, the rigidity against the load applied in the vehicle front-rear direction of the vehicle can be improved. Further, the extending portion 11a inclined upward is formed in the rear portion of the lateral bead 11. High rigidity can also be obtained against a load input applied in the up-down direction of the vehicle 1 due to the extending portion 11a.

As shown in FIGS. 3 and 5, the wheel arch reinforcing member 8 is provided between the side sill inner member 3 and the side sill reinforcing member 5. The wheel arch reinforcing member 8 has the mounting surface portion 8a fixed from the front along the shape of the front surface 9b of the wheel arch member 9. The mounting surface portion 8a can be connected having a predetermined area by bringing the surfaces overlapped with the front surface 9b into contact with each other. Therefore, it is possible to transmit the load applied in the vehicle front-rear direction more efficiently and improve the rigidity of the vehicle body.

Further, as the rigidity is improved, the degree of freedom of the shape of the wheel arch reinforcing member 8 can be improved. For example, a dimension in the vehicle front-rear direction of the wheel arch reinforcing member 8 can be shortened and the wheel arch reinforcing member 8 can be moved toward the rear wheel arch member 9. Thus, for example, another member can be disposed in front of the wheel arch reinforcing member 8. Therefore, the rigidity of the vehicle body can be further easily improved. Further, as shown in FIGS. 3 and 6, the jack-up plate 7 can be disposed in front of the wheel arch reinforcing member 8. Thus, the wheel arch reinforcing member 8 is disposed behind the jack-up plate 7 in the vehicle front-rear direction. Then, the wheel arch reinforcing member 8 is fixed along the curved shape of the front surface of the wheel arch member 9 located further rearward. In this manner, the jack-up plate 7 and the wheel arch reinforcing member 8 can be arranged side by side in the vehicle front-rear direction between the side sill inner member 3 and the side sill reinforcing member 5 (see FIGS. 2 and 3). Therefore, an arrangement efficiency of parts is improved, and the rigidity of the vehicle body can be improved while preventing an increase in weight.

As shown in FIGS. 2 and 3, the side sill reinforcing member 5 includes the straight portion 5a having the fixed vehicle width dimension, and the widened portion 5b widening the vehicle width dimension behind the straight portion 5a. The jack-up plate 7 is disposed in the straight portion 5a, and the straight portion 5a has the vertical beads 15 whose longitudinal direction aligned in the vehicle up-down direction corresponding to the position where the jack-up plate 7 is disposed. Therefore, the plurality of vertical beads 15 of the side sill reinforcing member 5 can further improve the rigidity of the position where the jack-up plate 7 is disposed.

Further, the opening reinforcing member 13 of the wheel arch reinforcing member 8 reinforces the opening peripheral edge portion 12 of the door. Therefore, it is possible to obtain a desired strength against the torsion of the vehicle body due to the opening shape of the opening peripheral edge portion 12 of the door. Moreover, the opening reinforcing member 13 can prevent the increase in the number of welding points during welding. In the present embodiment, as shown in FIGS. 7 and 8, the opening portion reinforcing member 13 is provided on the upper portion of the wheel arch reinforcing member 8. The opening reinforcing member 13 is disposed along the opening peripheral edge portion 12 of the door by mounting the wheel arch reinforcing member 8. The opening portion reinforcing member 13 is positioned between the upper end rear portion of the side sill inner member 3 and the front end portion of the joint flange portion 9c of the wheel arch member 9 and connects the both members in the vehicle front-rear direction. Thus, it is possible to reinforce the opening peripheral edge portion 12 without providing the welding point. The opening peripheral portion 12 reinforced by the opening portion reinforcing member 13 can obtain the desired strength against the torsion of the vehicle body due to the opening shape of the door.

Further in the present embodiment, the opening reinforcing member 13 is connected to the joint flange portion 9c reinforced by the pair of fixing leg portions 18b of the flange reinforcing member 18. Therefore, a mounting rigidity of the opening portion reinforcing member 13 is improved, and the desired strength can be obtained more easily.

Further, the wheel arch member 9 has the wheel arch extension member 19 extending downward from the front surface 9b. The second fixing portion 5d is fixed to the connecting portion 20. In the connecting portion 20, the wheel arch member 9 and the wheel arch extension member 19 are overlapped, and its strength is improved as compared with another portion having a single member. Therefore, the mounting rigidity of the side sill reinforcing member 5 can be improved.

As described above, in the vehicle body structure of the present embodiment, it is possible to efficiently improve the rigidity of the vehicle body by good arrangement efficiency of the parts. It is possible to obtain a desired strength against the load input from the side surface and the vehicle front-rear direction by improving the rigidity of the vehicle body. Further, it is possible to prevent a reduction in rigidity due to the opening shape of the opening peripheral edge portion 12 of the door. In particular, the mounting piece portion 5f of the first fixing portion 5c for distributing the stress due to the load in the torsional direction together with the second fixing portion 5d is connected to the front surface 9b of the wheel arch member 9. Thus, the load applied in the vehicle front-rear direction is effectively transmitted between the side sill 2 and the wheel arch member 9, so that a desired rigidity of the vehicle body can be obtained.

Further, the jack up plate 7 and the wheel arch reinforcing member 8 can be arranged sandwiched between the side sill inner member 3 and the side sill reinforcing member 5 forming the opening peripheral edge portion 12 of the door. Moreover, the desired strength can be obtained by performing a connection using a fastening means such as a bolt member or the like. Therefore, a manufacturing efficiency is also good without increasing the number of connection points by welding or the like. Therefore, the vehicle body structure capable of improving the rigidity of the vehicle body is provided by improving the arrangement efficiency of the parts.

The present invention is not limited to the above-described embodiments, and various modifications are possible. The above-described embodiments are exemplified for easy understanding of the present invention, and are not necessarily limited to those having all the configurations described. In addition, a part of the configuration of one embodiment can be replaced by the configuration of another embodiment, and the configuration of another embodiment can be added to the configuration of one embodiment. In addition, it is possible to delete a part of the configuration of each embodiment, or to add/replace another configuration. For example, possible modifications to the above embodiment are as follows.

In the vehicle body structure of this embodiment, as shown in FIGS. 1 and 2, the first fixing portion 5c and the second fixing portion 5d of the side sill reinforcing member 5 are brought into contact with and fixed to the wheel arch member 9. However, it is not particularly limited thereto. For example, as long as at least the first fixing portion 5c and the second fixing portion 5d of the side-sill reinforcing member 5 are respectively fixed to the outer surface 9a and the front surface 9b of the wheel arch member 9, the side sill reinforcing member 5 may be fixed to the wheel arch member 9 with three or more fixing portions. That is, a fixing method including the number, shape and welding of the fixing portions is not particularly limited as long as they are fixed to different side surfaces at least two places.

Further, another lateral bead may be provided instead of one lateral bead 11 shown in FIG. 2 or together with the lateral bead 11. One or more lateral beads 11 may be provided at any position of the side sill reinforcing member 5. For example, an inclination angle of the extending portion 11a, the presence or absence of branching when a plurality of lateral beads 11 are provided, the number of branches, the shape and quantity of the lateral bead 11, and the presence or absence of the seal hole portion 11b are not particularly limited.

Further, the plate-like portion 8c may have a rectangular shape, a square shape, another polygonal shape, or the like. That is, it is sufficient that the wheel arch reinforcing member 8 is provided between the side sill inner member 3 and the side sill reinforcing member 5. The shape, quantity, material and a mounting position of the plate-like portion 8c are not particularly limited.

Further, the jack-up plate 7 may have a rectangular shape, a square shape, another polygonal shape, or the like. Further, the jack-up plate 7 may be provided at any other position of the side sill 2, without being provided between the side sill inner member 3 and the side sill reinforcing member 5.

Furthermore, for example, even when the reinforcing bead 7b of the jack-up plate 7 and the vertical beads 15 of the side sill reinforcing member 5 do not overlap each other, it is sufficient that positions of the vertical beads 15 of the straight portion 5a correspond to the position where the jack-up plate 7 is disposed, and the shape, the number and arrangement positions of the vertical beads 15 are not particularly limited.

As shown in FIGS. 7 and 8, the opening portion reinforcing member 13 having another shape, for example, a crescent shape or the like may be used in place of the opening portion reinforcing member 13 shaped along the opening peripheral edge portion 12 of the door. Further, the connecting portion 20 is not limited to a position where the wheel arch member 9 and the wheel arch extension member 19 are overlapped with each other. The second fixing portion 5d may be fixed to any portion of the wheel arch member 9 as long as it is a position where the side sill reinforcing member 5 can be fixed, for example, a lower edge of the front surface 9b or the like.

REFERENCE SIGNS LIST

1: vehicle
2: side sill
3: side sill inner member
3a: rear portion
3c: stepped portion
4: side sill outer member
5: side sill reinforcing member
5a: straight portion
5b: widened portion
5c: first fixing portion
5d: second fixing portion
7: jack-up plate
8: wheel arch reinforcing member
8a: mounting surface portion
8b: reinforcing rib portion
9: wheel arch member
9a: outer surface
9b: front surface
11: lateral bead
11a: extending portion
12: opening peripheral edge portion
13: opening portion reinforcing member
15: vertical bead
19: wheel arch extension member
20: connecting portion

The invention claimed is:
1. A vehicle body structure comprising:
a side sill extending in a vehicle front-rear direction and having at least a side sill inner member;

a side sill reinforcing member disposed outside in a vehicle width direction of the side sill inner member at a rear portion of the side sill;

a wheel arch member disposed behind the side sill;

a wheel arch extension member extending downward from a front surface of the wheel arch member, wherein the side sill reinforcing member comprises:

a first fixing portion fixed in the vehicle width direction to an outer surface of the wheel arch member; and a second fixing portion fixed in the vehicle front-rear direction to the front surface of the wheel arch member, and the second fixing portion is overlapped with and fixed to a connecting portion of the wheel arch member and the wheel arch extension member.

2. The vehicle body structure according to claim 1, wherein a lateral bead whose longitudinal direction aligned in the vehicle front-rear direction is provided on an outer surface in the vehicle width direction of the side sill reinforcing member, and an extending portion inclined upward is formed in a rear portion of the lateral bead.

3. The vehicle body structure according to claim 1, wherein a wheel arch reinforcing member is provided between the side sill inner member and the side sill reinforcing member, and the wheel arch reinforcing member has a mounting surface portion fixed from the front along a shape of the front surface of the wheel arch member.

4. The vehicle body structure according to claim 3, wherein a jack-up plate is disposed in front of the wheel arch reinforcing member between the side sill inner member and the side sill reinforcing member.

5. The vehicle body structure according to claim 4, wherein the side sill reinforcing member comprises: a straight portion having a constant vehicle width dimension in the vehicle front-rear direction; and a widened portion widened in the vehicle width direction behind the straight portion, and the jack-up plate is disposed on the straight portion, and the straight portion has a vertical bead whose longitudinal direction aligned in a vehicle up-down direction corresponding to a position where the jack-up plate is disposed.

6. The vehicle body structure according to claim 3, wherein the wheel arch reinforcing member has an opening portion reinforcing member for reinforcing an opening peripheral edge portion of a door along the opening peripheral edge portion.

* * * * *